United States Patent [19]
Tabor

[11] 3,939,755
[45] Feb. 24, 1976

[54] LINEAR HYDRAULIC MOTOR
[75] Inventor: Hanani Tabor, Carmiel, Israel
[73] Assignee: Amiad Systems Limited, Khorazim, Israel
[22] Filed: Jan. 28, 1974
[21] Appl. No.: 437,102

[30] Foreign Application Priority Data
 Mar. 5, 1973 Israel.................................. 41682

[52] U.S. Cl. ...................... 91/224; 91/235; 91/342
[51] Int. Cl.².. F01L 15/12; F01B 7/18; F01L 23/00
[58] Field of Search ............. 91/224, 235, 342, 229

[56] References Cited
UNITED STATES PATENTS

| | | |
|---|---|---|
| 1,499,569 | 7/1924 | Bailly.................................. 91/235 |
| 1,665,046 | 4/1928 | Tucker................. 91/235 |
| 1,965,064 | 7/1934 | Zwayer................. 91/224 |
| 2,851,013 | 9/1958 | Doughton............. 91/224 |

*Primary Examiner*—Paul E. Maslousky
*Attorney, Agent, or Firm*—Michael P. Breston

[57] ABSTRACT

This invention relates to a linear hydraulic motor or actuator, more especially to a hydraulic motor in combination with a piston pump, serving to inject liquid fertilizers into a water pipe line.

3 Claims, 4 Drawing Figures

LINEAR HYDRAULIC MOTOR

BACKGROUND OF THE INVENTION

Linear hydraulic motors to be driven by water from a municipal or rural supply system are well known in the art and are used in all cases where no electricity is available, where a certain waste of water is of no importance, and where an internal combustion engine would be too cumbersome for the relatively small power output required. These hydraulic motors work on the principle of a reciprocating piston or diaphragm assisted by flexible means such as steel springs, rubber cushions and the like. Water inlet and/or outlet are either controlled by valves or are covered and uncovered by the reciprocating piston or its extension. In another type of motor, flip-flop valves are used for closing and opening the water inlet and to control the piston or diaphragm movement.

The main drawback of this type of apparatus is that these flexible means deteriorate and change their modulus of elasticity with time so that they require frequent exchange and replacement.

In view of the above it is the object of the present invention to provide a linear hydraulic motor with a minimum of moving parts and without the use of flexible parts. Another object is to provide such motor in robust construction at a relatively low price.

SUMMARY OF THE INVENTION

The hydraulic motor according to the invention comprises a cylinder casing, a differential piston and a valve assembly positioned within the piston, the piston being reciprocatingly driven by water under pressure entering the casing and being alternately directed to the front and the rear face of the differential piston by the valve assembly which also serves to direct the water, after depressurisation, to the outside.

BRIEF DESCRIPTION OF THE DRAWINGS

With reference to FIG. 1 a combined motor and pump comprises a cylinder casing A, a piston assembly B and a valve assembly C. In the following the left end of the unit which contains the motor will be called the "front," and the right end, where the pump is housed will be called the "rear." The cylinder casing is stepped to form three cylinder bores of different diameters, the smallest being on the rear end and serving as pump cylinder 1. The central guide cylinder 2 is larger while the front working cylinder 3 has the largest bore. The rear end of the pump cylinder is provided with an outlet valve 4 and an inlet valve 5 on top of the casing which connects the bottom of a container 25, for liquid to be pumped, with the pump cylinder. The guide cylinder 2 is provided with a vent and drainhole 6 in its lower half. The large working cylinder at the front possesses a water inlet 7 near its line of junction with the guide cylinder and a cylindrical bore 8 in the center of the front casing-cover 9.

Figure 1:
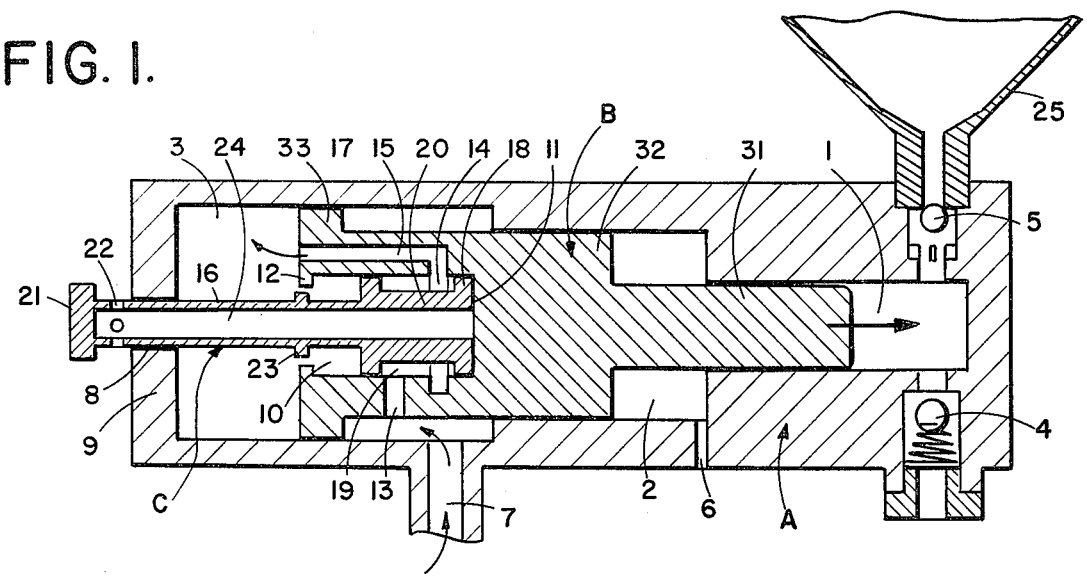
FIG. 1 shows a diagrammatic section through a linear motor adapted to drive a piston pump.

The piston assembly is stepped to the same diameters as the cylinder casing, allowing its sliding movement therein. It possesses a relatively long pump piston 31, a long central guide part 32 fitting into the central cylinder portion and a short collar-like working piston 33. The front end of the piston is flat and possesses a co-axially positioned cylindrical bore 10 which extends into the piston assembly to about half-way the guide piston portion and forms the casing for the spool of the valve assembly. Its rear end 11 is completely flat and smooth, while its front end is provided with an internal collar, teeth or a similar projection 12 serving as stop for the valve spool. The casing 10 possesses two ports, a first port 13 halfway between its front and rear end connecting it to the rear of the working cylinder 3; and a second port 14 in the shape of an annular groove placed at a relatively small distance from the rear end connected by at least one bore 15 to the flat front end of the piston assembly, thereby connecting the cylindrical bore 10 with the front of the working cylinder 3.

The valve assembly comprises a cylindrical spool of a diameter adapted to slide in the valve-casing bore 10 and of a length shorter than the length of the bore. It has an annular circumferential groove 19 leaving at each end a front collar 17 and a rear collar 18, its rear end being flat and smooth thus forming, in its rearward position, a tight closure with the rear part of the cylindrical bore 10. Its length is so designed that in its rearmost position the rear collar 18 lies to the right of the annular groove 14, while in its foremost position, defined by contact of the front collar 17 with the stop 12, the collar 18 lies in front of the groove.

The spool has a central cylindrical bore 24 which is continued to the outside of the cylinder casing by an outlet tube 16 integral and co-axial with the valve spool. The diameter of the tube fits into the bore 8 in the front cover and passes through it to the outside; it is closed at its front end by a solid disc 21 which is of larger diameter and thus serves as a shoulder stop to the rear movement of the valve assembly. A number of outlet openings 22 are arranged circumferentially near the closed front end to the rear of the disc 21 and connect the outlet tube interior with the atmosphere. A low, inner shoulder 23 is provided around the tube adjacent to the piston front face serving as stop to the forward movement.

The operation of the motor unit will now be explained with regard to FIGS. 1, 2 and 3 of the drawing. The piston assembly B as appearing in FIG. 1, moves to the right - as indicated by the arrow - due to water pressure acting on the front face of the working piston assembly 33. Water under pressure enters the cylinder 3 through the inlet 7 and passes through port 13 into the circumferential groove 19 of the spool, from there through port 14 and bore 15 to the front part of the cylinder.

The pressure exerted by the water on the front face of the spool tends to press it against the rear face of the bore 10, thus keeping the water passages open. A counterforce is exacted by the water pressure on the annular rear face of the differential piston 33, so that the force acting on the pump cylinder is the difference of the areas times the water pressure.

Figure 2:
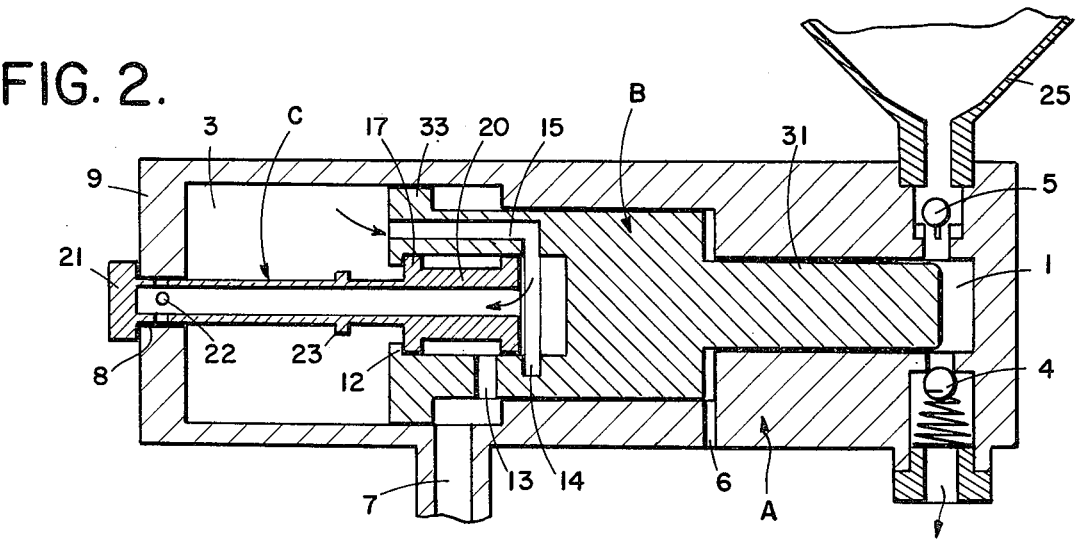
FIG. 2 shows the apparatus as shown in FIG. 1 but with the piston in its rear end position.
Figure 3:
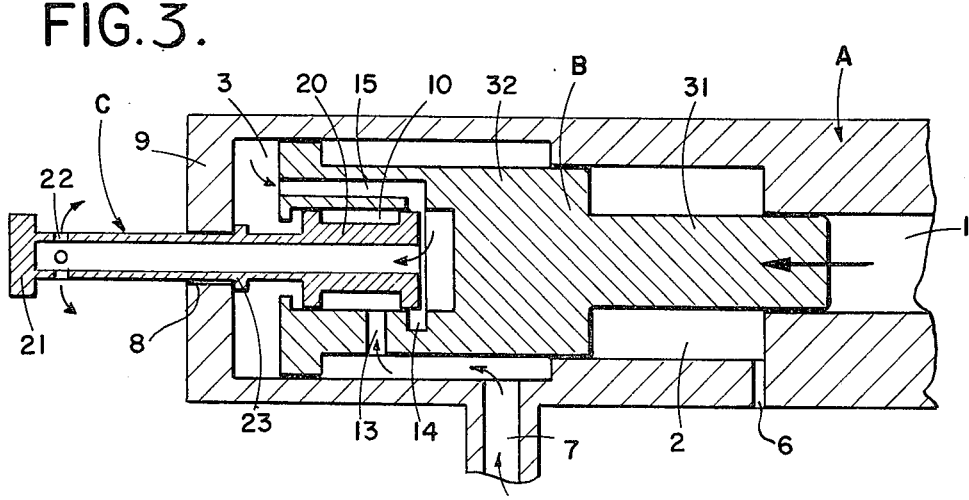
FIG. 3 shows the same apparatus but with the piston nearing its extreme front position.

FIG. 2 shows the piston assembly to have reached its rearmost position and shows the valve at the moment of reversing its direction of motion to the front. At the end of the back-stroke - which is shown in FIG. 1 -the valve is stopped by the disc or shoulder 21 contacting the casing cover 9; at the same time the outlet openings 22 are covered and closed while they disappear within the bore 8 of the front cover. The full water pressure continues to act on the front face of the piston assembly driving it back until the rear collar 18 of the spool covers the annular groove 14 in the piston, cutting off the water supply to the cylinder 3, however maintaining the pressure therein for the time being. Since the width of the collar 18 is equal to or somewhat smaller than that of the groove 14, a small gap opens at the rear edge of the collar as soon as the latter shuts off the groove by its front edge, thus allowing water under pressure to reach the rear end of the valve, driving the valve assembly toward the front. The same pressure acts on the annular front face of the spool valve, however since this area is smaller than the rear face area, it is the differential pressure that drives it forward within the cylindrical bore 10 until it contacts the projection 12 at the front end thereof. Simultaneously the outlet openings 22 are uncovered and the front part 3 of the cylinder is now opened to atmospheric pressure via the duct 15, the groove 14, the rear portion of the bore 10 and the cylindrical bore 24, allowing the water to flow out of the cylinder through the outlet openings 22. The full pressure now acts on the annular rear face of the front piston 33, driving the assembly toward the front, since the piston front face is at atmospheric pressure.

During movement of the piston assembly to the front, the valve assembly remains in the forward position in contact with the stop 12, until its shoulder 23 encounters the inside of the casing cover 9. While the piston assembly continues on its way to the front, driven by the pressure on the rear annular face of the front piston, the collar 18 of the valve gradually covers the annular groove 14, until it opens the connection between the supply 7 to the front cylinder 3, building up pressure in this space. This pressure not only drives the piston assembly to the rear, but also drives the valve to the rear of the cylindrical bore, acting on its annular front face, the rear face being at atmospheric pressure (FIG. 1). In the present embodiment the reciprocating action of the piston assembly serves to pump liquid from the container 25 through the outlet valve 4 into a pipe line.

Figure 4:
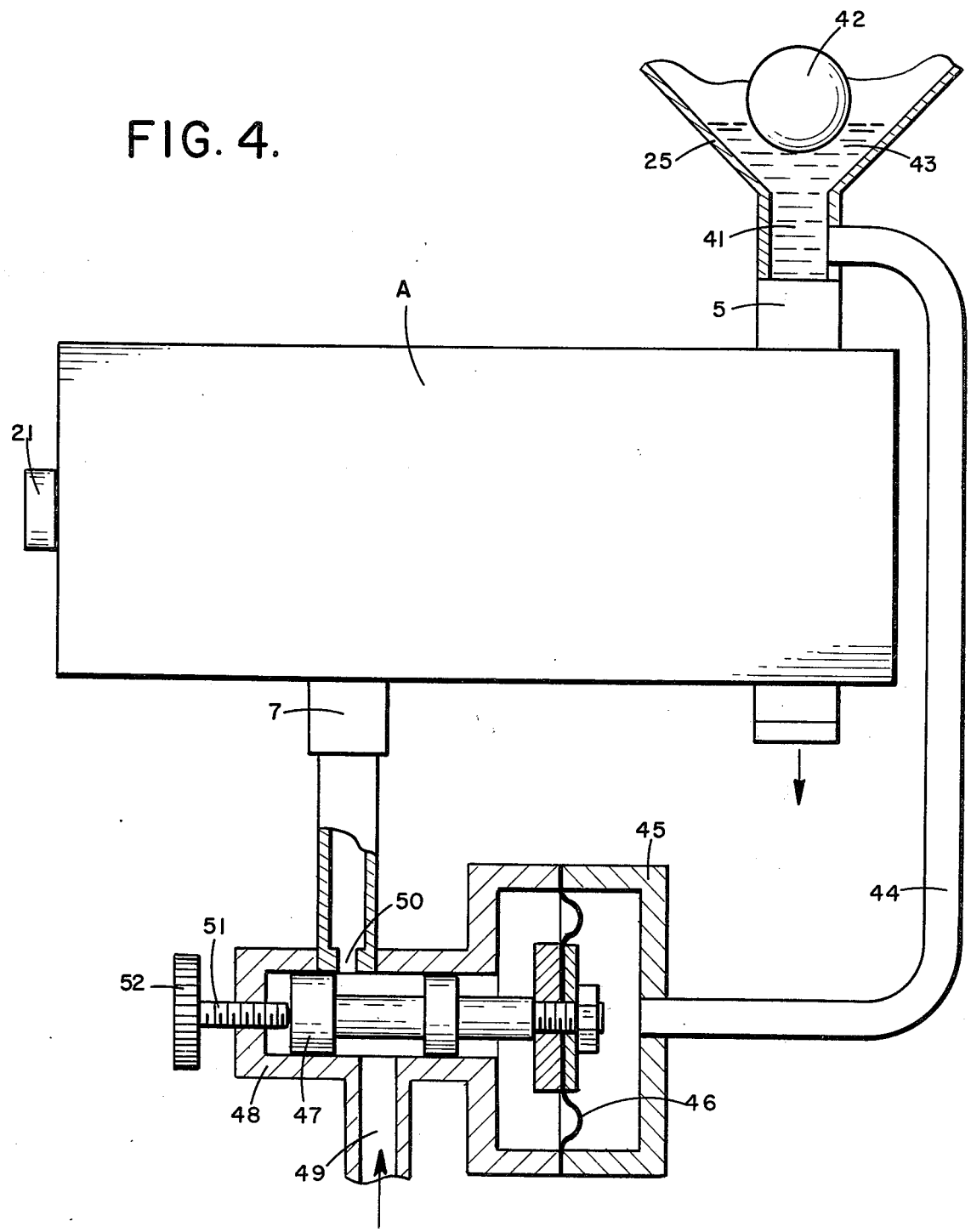
FIG. 4 illustrates, in diagrammatic section, an automatic water-inlet closing-mechanism to be used with the hydraulic motor illustrated in FIGS. 1 to 3.

The control device shown in FIG. 4 of the drawing is attached to the water inlet 7 of the hydraulic motor on the one hand, and to the container 25 and inlet valve 5 of the piston pump on the other hand. The container 25 is shaped in the form of a cone, with its outlet to the suction valve 5 in the shape of a Tee-piece 41. A ball-shaped float 42 of rubber or plastic material is carried on the surface of the liquid 43 to be pumped, such as liquid fertilizer, and will sink to the bottom with the liquid emptying out of the container, until it rests on the outlet opening and closes it. The Tee-piece connects to a pipe 44 which leads to a housing 45 containing a flexible diaphragm 46. This diaphragm is free to move in the housing in a horizontal direction and is connected to a valve spool 47 which is adapted to slide in a control valve housing 48. The latter possesses a water inlet 49 and an outlet port 50 which is kept open as long as the diaphragm is in its median position, but is closed by movement of the diaphragm to the right, pulling with it the valve spool and covering the port. A screw 51 at the left-hand end of the valve housing enables manual control - by means of a knurled handwheel 52 - of the water quantity to be admitted to the motor, by reducing the width of the port opening.

The diaphragm is pulled to the right, together with the valve spool, by an underpressure created by the pump piston when the ball float closes the container outlet. This causes stopping of the hydraulic motor by cutting off its water supply, thus preventing waste of water when no liquid is to be pumped. For restarting, the diaphragm is pulled back manually into its initial position.

The invention is not limited to the embodiment shown hereinbefore, but may be modified by a person skilled in the art, within the scope of the appended Claims.

For instance, the hydraulic motor may be utilized for driving different reciprocating machinery, instead of a pressure pump, as in the present embodiment.

The valve may be modified by that a plurality of inlet ports 13 are distributed on the circumference, in order to allow greater water quantities to pass there through. Similarly, a larger number of connecting bores 15 may be provided entering the circumferential groove 14 in several places.

On the other hand, instead of the groove 14, a simple port may be advisable, if the water quantities used are small.

The rear face of the bore 10 as well as the rear end of the spool 20 have been shown and described to be flat surfaces. However, as long as they form a tight fit and prevent water from penetrating between their surfaces and to pass to the outside through tube 16, they may be hemispherical, conical or otherwise shaped.

What is claimed is:

1. A linear hydraulic motor for operation by a liquid under pressure, comprising:
   a stepped cylinder casing having: a front cover, a large bore portion in its front part closed by said front cover, a smaller bore portion in its rear part, and a liquid inlet in the rear of the large bore;
   a differential piston unit reciprocable in the cylinder casing, said unit consisting of a large diameter front piston slidingly movable in the large bore portion, and of a smaller-diameter rear piston slidingly movable in the smaller-diameter bore,
   said piston unit having a smooth central bore whose front end extends through the front end of the large-diameter piston whereat the bore diameter is narrowed by an inwardly projecting stop, and the central bore's rear end being within the confines of the smaller-diameter piston,
   said central bore providing a first fluid communication path with said large-bore portion through a first port extending from the front end of the piston to a point distanced from the central bore's rear end, and a second port extending between a surface of the smaller-diameter piston and the central bore at a point situated to the front of the first port, and providing a second fluid communication path between the central bore and said liquid inlet,
   a hollow spool valve adapted to slide in the central piston bore in reciprocal motion from a frontal position in the bore defined by contact of the valve's front end with the said stop to a rearward position defined by contact of the valve's rear end with the rear end of the central bore,
   said spool valve comprising a front collar, a rear collar and an annular groove extending between the two collars, the valve being elongated towards the front in the shape of a cylindrical outlet tube which is guided in a bore provided in the front cover of the casing and protrudes through this cover to the outside, an outer limit stop and an inner limit stop on said tube adapted to alternately contact the outer and the inner surfaces of the front cover, the outer stop being positioned on the tube so as to define, by its contact with the front cover, the rear limit of the piston stroke during the front position of the spool valve in the central bore, and the inner stop being positioned on the tube so as to define by its contact with the front cover, the front limit of the piston stroke during the rearward position of the spool valve in the central bore, a central port in the spool valve opening at the rear end of the spool valve and extending through the outlet tube to a point short of the front end of this tube where it is in fluid communication with the atmosphere through at least one radial opening positioned to the rear of the outer limit stop, disposition of said first and second ports in the piston unit being such that in the frontal position of the piston unit with the spool valve in its rear position, fluid communication is created between the liquid inlet and the large-bore cylinder through the first port, the annular groove and the second port, and that in the rear position of the piston unit with the spool valve in its frontal position, fluid communication is created between the large-bore portion and the atmosphere through the first port, the rear end of the central bore, the central valve port, and the radial opening at the end of the outlet tube.

2. A linear hydraulic motor as claimed in claim 1 wherein said first port joins the central bore through a recessed annular groove of a width small compared with its inner diameter.

3. A linear hydraulic motor as claimed in claim 2, wherein the rear collar of said spool valve is of substantially the same width as that of the recessed annular groove in the wall of the central bore.

* * * * *